(12) United States Patent
Rothman et al.

(10) Patent No.: US 8,281,116 B2
(45) Date of Patent: *Oct. 2, 2012

(54) SYSTEM AND METHOD FOR UTILIZING A PROTECTED/HIDDEN REGION OF SEMICONDUCTOR BASED MEMORY/STORAGE

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 289 days.

This patent is subject to a terminal disclaimer.

(21) Appl. No.: 12/347,840

(22) Filed: Dec. 31, 2008

(65) Prior Publication Data

US 2010/0332813 A1 Dec. 30, 2010

Related U.S. Application Data

(63) Continuation-in-part of application No. 12/135,076, filed on Jun. 6, 2008, now abandoned, which is a continuation of application No. 10/364,994, filed on Feb. 12, 2003, now Pat. No. 7,395,420.

(51) Int. Cl.
*G06F 15/177* (2006.01)
(52) U.S. Cl. .......................................................... 713/2
(58) Field of Classification Search .................. 713/1, 2
See application file for complete search history.

(56) References Cited

U.S. PATENT DOCUMENTS 6,360,945 B1 * 3/2002 Drew .............................. 235/382
7,054,990 B1 * 5/2006 Tamura et al. ................. 711/103

* cited by examiner

*Primary Examiner* — Kim Huynh
*Assistant Examiner* — Eric Chang
(74) *Attorney, Agent, or Firm* — Schwabe, Williamson & Wyatt, P.C.

(57) ABSTRACT

A method for accessing a protected area of a solid-state storage device via firmware control is described. During system initialization, firmware components are loaded and executed to initialize a computer system. These firmware components include a firmware driver for accessing solid-state storage devices connected to the computer system. The system firmware enables a protected area on a solid-state storage device's media to be accessed under firmware control. After firmware accesses, the protected area is closed from access by non-firmware entities by "hiding" the true size of the media such that those entities are unaware of this area of the media. Mechanisms are disclosed for providing firmware access to the protected area only during pre-boot, and for both pre-boot and run-time operations. The firmware-controlled media access scheme may be used to load firmware stored on solid-state media during pre-boot and to store system information in the protected area during pre-boot and/or run-time operations.

34 Claims, 10 Drawing Sheets

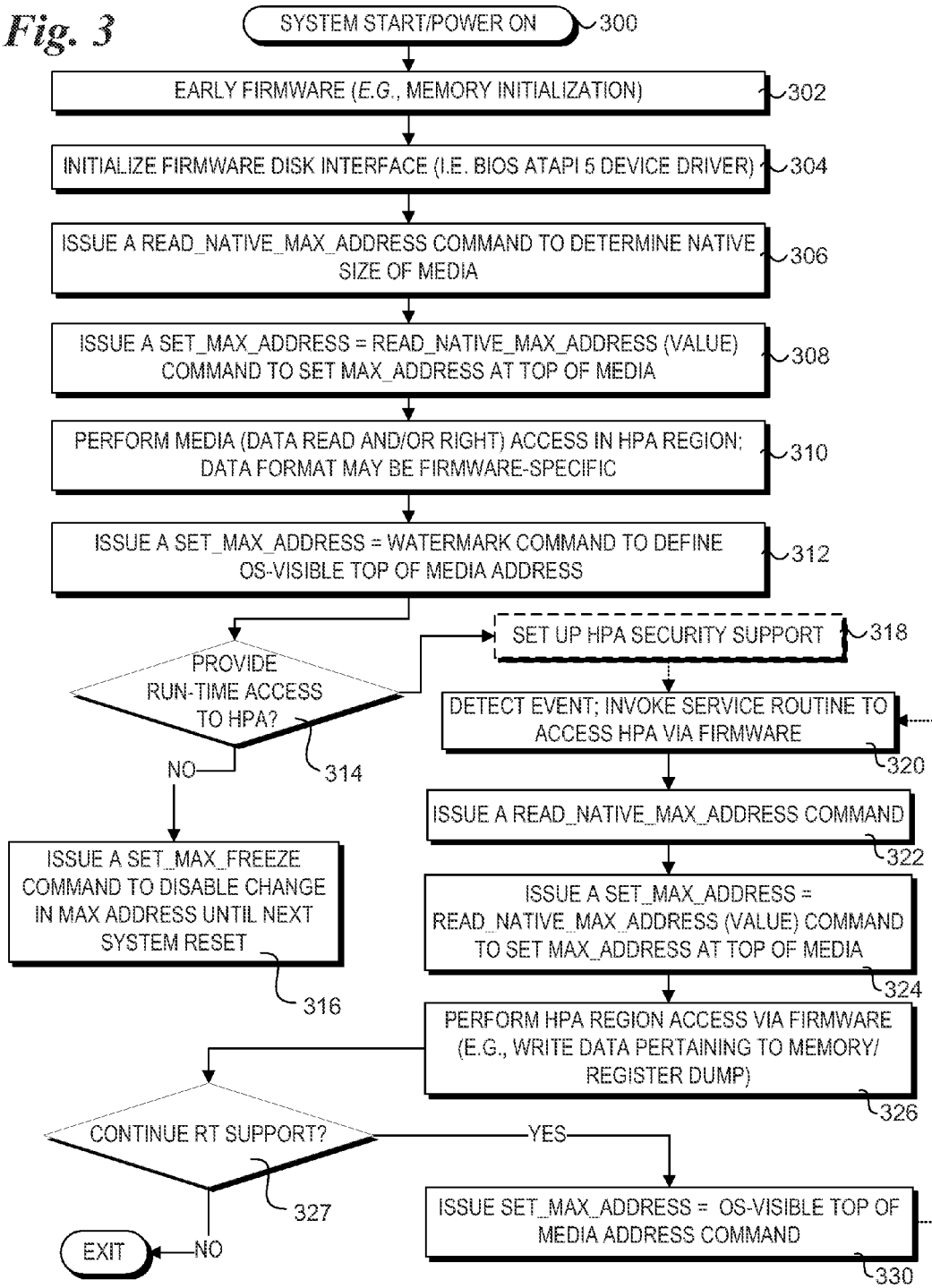

SYSTEM AND METHOD FOR UTILIZING A PROTECTED/HIDDEN REGION OF SEMICONDUCTOR BASED MEMORY/STORAGE

CROSS-REFERENCE TO RELATED APPLICATION

This application is a Continuation In Part Application to U.S. patent application Ser. No. 12/135,076, entitled "Using Protected/Hidden Region Of A Magnetic Media Under Firmware Control," filed on Jun. 6, 2008 now abandoned by Michael A. Rothman et al., which is a Continuation Application to U.S. patent application Ser. No. 10/364,994, entitled "Using Protected/Hidden Region Of A Magnetic Media Under Firmware Control," filed on Feb. 12, 2003, now issued as U.S. Pat. No. 7,395,420, all assigned to a common assignee, the entire subject matter which is herein incorporated by reference.

FIELD OF THE INVENTION

The field of invention relates generally to computer system and, more specifically but not exclusively relates to firmware-controlled access to a protected or hidden area of a semiconductor, or solid-state, base storage media.

BACKGROUND INFORMATION

Computer platform firmware is used during initialization of computer systems to verify system integrity and configuration. It also generally provides the basic low-level interface between hardware and software components of those computer systems, enabling specific hardware functions to be implemented via execution of higher-level software instructions contains in computer programs that run on the computer systems. In computers, a primary portion of this firmware is known as the Basic Input/Output System (BIOS) code of a computer system. The BIOS code comprises a set of permanently recorded (or semi-permanently recorded in the case of systems that use flash BIOS) software routines that provides the system with its fundamental operational characteristics, including instructions telling the computer how to test itself when it is turned on, and how to determine the configurations for various of built-in components and add-on peripherals.

In a typical personal computer (PC) architecture, the BIOS is generally defined as the firmware that runs between the processor reset and the first instruction of the Operating System (OS) loader. This system initialization time-frame is commonly referred to as "pre-boot," and the execution environment prior to OS loading is called the pre-boot environment. As shown in FIG. 1, in a typical PC 100, the base portion of the BIOS code is stored in some type of ROM (read only memory) device on the PC's mainboard (i.e., motherboard) 102, such as a standard PROM 104 or a flash memory device 106. In some configurations, this base portion may be extended using code stored in ROM BIOS chips 108 contained on one or more add-on peripheral cards 110, such as SCSI controllers and bus-mastering devices. This portion of the BIOS is stored in components that are commonly referred to as "option ROMs." The BIOS code in peripheral card ROM BIOS chips 108 typically concerns specific functionality provided by their corresponding peripheral card and is executed during initialization of that peripheral card according to a (mostly) well-defined set of rules. In either of the foregoing configurations, all BIOS firmware is stored on non-volatile memory devices, either on the motherboard or in option ROMs on the peripheral card(s) added to a system.

In many instances, the basic functionality of a computer system platform is defined by the platform's firmware. Accordingly, in order to enhance this functionality, corresponding code needs to be added to or modified in the firmware. In existing PCs, this may be accomplished by either replacing the BIOS chip(s) on the motherboard (and/or peripheral cards), or, if those BIOS code is contained in rewritable chips (e.g., flash memory chips), executing a BIOS update software program that replaces the existing BIOS code with new code. Both of these methods requires user actions that may be prone to error, including improperly installing the new BIOS chips and inadvertently damaging the BIOS code by updating it with the wrong code or having a power failure or system crash in the middle of the code-update process. Furthermore, extensions to the system firmware are limited to the firmware code that may be stored on these IC-based firmware devices.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 3 is a flowchart illustrating a process in accordance with one embodiment of the invention by which magnetic media may be accessed under firmware control;

DETAILED DESCRIPTION OF PREFERRED EMBODIMENTS

Embodiments of methods and systems that enable access to and employ a protected or hidden region of a semiconductor based memory, or flash memory in a pre-boot environment are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Conventional BIOS Operation

In a conventional computer system, the BIOS starts to work as soon as a system is turned on. For example, when existing microprocessors, for example, available from Intel Corporation, e.g., Pentium III, IV, start to work, they immediately set themselves up in real mode and look at a special memory location 16 bytes short of the top of the one-megabyte real mode addressing range, absolute address 0FFFF0 (Hex). This location holds a jump instruction that redirects the processor to begin execution of code at another address corresponding to where the base portion of the BIOS is actually stored, such as ROM chip 102.

Figure 1:
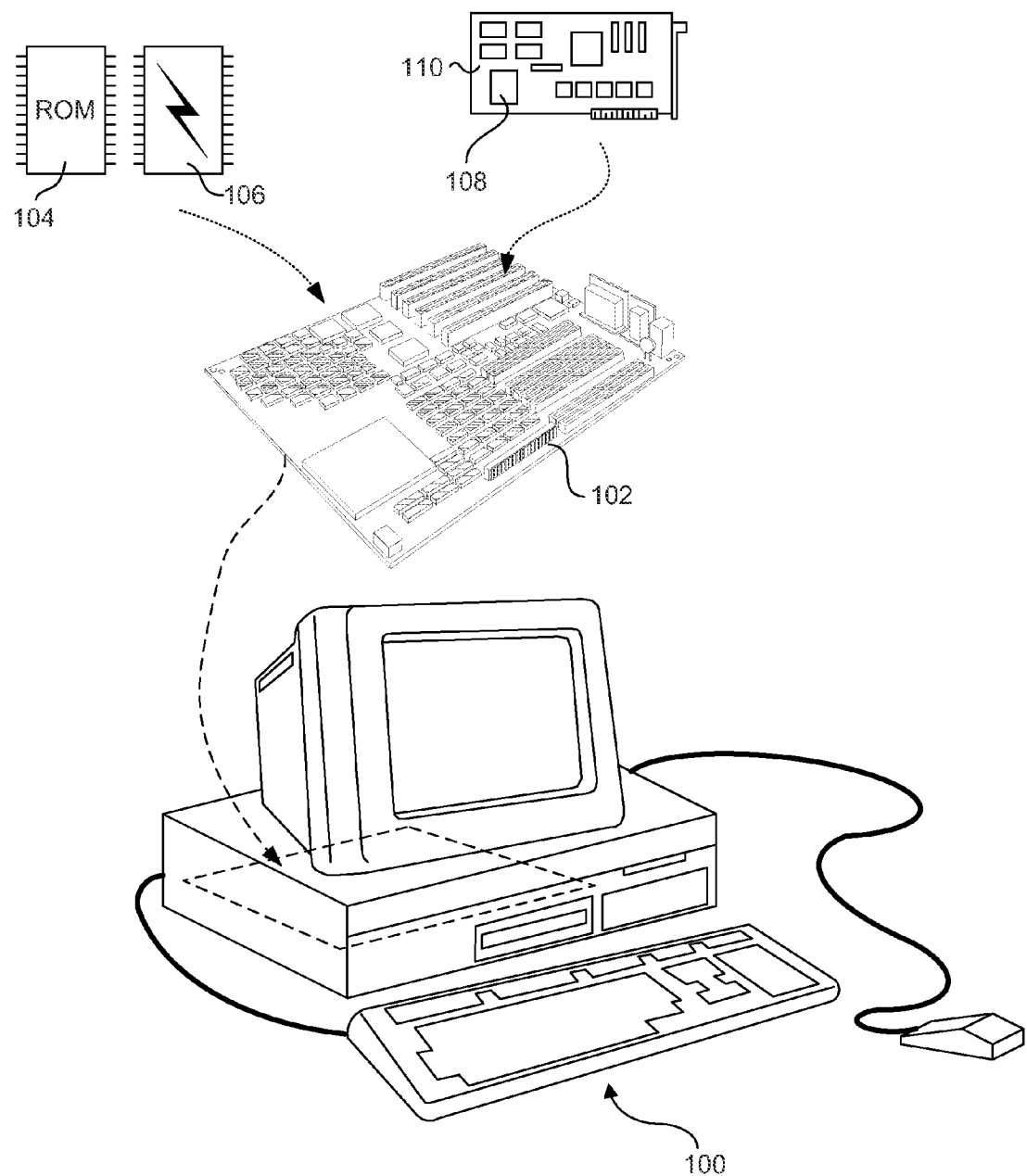
FIG. 1 is a schematic diagram of a computer system containing conventional firmware for describing a conventional firmware loading scheme.
Figure 2:
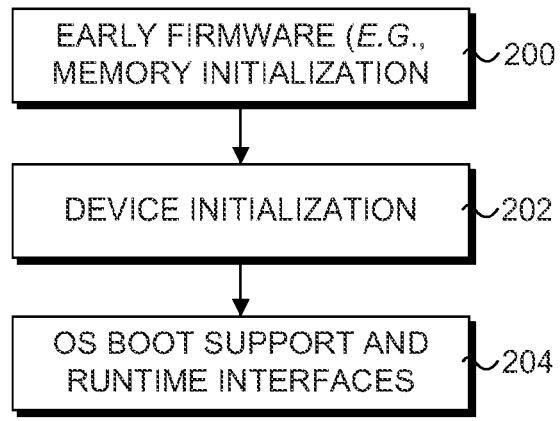
FIG. 2 is a flowchart illustrating high level operations corresponding to pre-boot operations performed subsequent to loading a computer operating system.

Execution of the first portion of BIOS code performs a series of diagnostic routines, called the Power-On Self Test (POST) routine, which ensures the major hardware components in a computer system are functioning properly. As depicted by a block 200 in FIG. 2, during a first (i.e., early firmware) phase of the POST routine the BIOS enumerates and initializes the system memory and performs other critical chipset initialization operations. One by one, the POST routine checks the integrity of the motherboard, processor, and memory, and checks for the existence of various devices, including a mouse, a keyboard, various storage devices (e.g., floppy drive, hard drives, CD ROM drives, tape drives, etc.), and other components corresponding to configuration information stored in the computer's CMOS memory, or similar persistent storage. As depicted by a second phase block 202, after the BIOS makes sure that the system is operating properly, it enumerates all non-memory devices on all busses in the system and initializes and starts these devices, as appropriate. In a third phase 204, the BIOS provides means for initiating the loading of the OS and produces runtime interfaces.

Magnetic Media Firmware-Controlled Access Scheme

As discussed above, in conventional personal computers, all of the BIOS code is stored in ROM-type devices local to the computer, either entirely on the motherboard, or via ROM devices on the motherboard and option ROMs on one or more peripheral add-on cards. Such local storage devices are termed silicon firmware devices as used herein. In accordance with aspects of the invention, a first mechanism is now disclosed for enabling access to one or more firmware resources stored on magnetic media, such as that employed by a computer's hard disk system. More particularly, the mechanism employs a protected or hidden region of a hard disk media that is used to store important data in a manner that is transparent to the operating system, and is accessible in the pre-boot environment.

A mechanism has been introduced in PCs that allows a system to access storage locations on magnetic media without depending on disk access functionality that is normally provided by an operating system during run-time. This mechanism may be employed on magnetic storage devices having controllers that support the Host Protected Area (HPA) feature set. In particular, the Host Protected Area is a feature that was introduced by the ATA/ATAPI-4 (AT Attachment Packet Interface) standard, and accordingly, hard disk controllers that support the standard (and subsequent versions such as ATA/ATAPI-5, which updated the standard) provide direct access to store data on and retrieve data from magnetic media via a corresponding HPA feature command set. Currently, this standard is used to achieve a pseudo-disk capability such that the system can have an alternate location to boot from other than the O/S controlled remainder of the disk. This has been used to launch items like system diagnostics in the past.

In accordance with the principles and teachings of the invention, techniques for supporting various usage models are disclosed that take advantage of HPA access for enhanced system functionality. These usage models include: 1) the ability to deprecate FAT (file allocation table) driver support from firmware flash so a firmware volume (which firmware has native support for) can be placed in the HPA area; 2) the ability to store many extensibility modules in the HPA region for additional pre-boot support without encumbering flash overhead which is at a premium; 3) Firmware can enable the saving of critical file-system structures to the HPA for recovery of broken boot structures, since these structures could have been affected by viruses or malfunctioning programs. An operating system would not normally be able to recover a failure in a boot structure since it has yet to be loaded in this case; 4) one can place data to the HPA region in an O/S independent fashion. This allows for critical system core dumps to take place in the pre-boot and the storing of this information without the need to understand the native filesystem on the media. Using ram firmware formats to write this data is sufficient for this private region of the media. Generally, the HPA region may be used to store almost any system-related data, and may further include storing system secrets for further security extensibility, storing manageability information (e.g., even logs, manufacturing data, etc.), and storing other types of configuration information.

Figure 4:
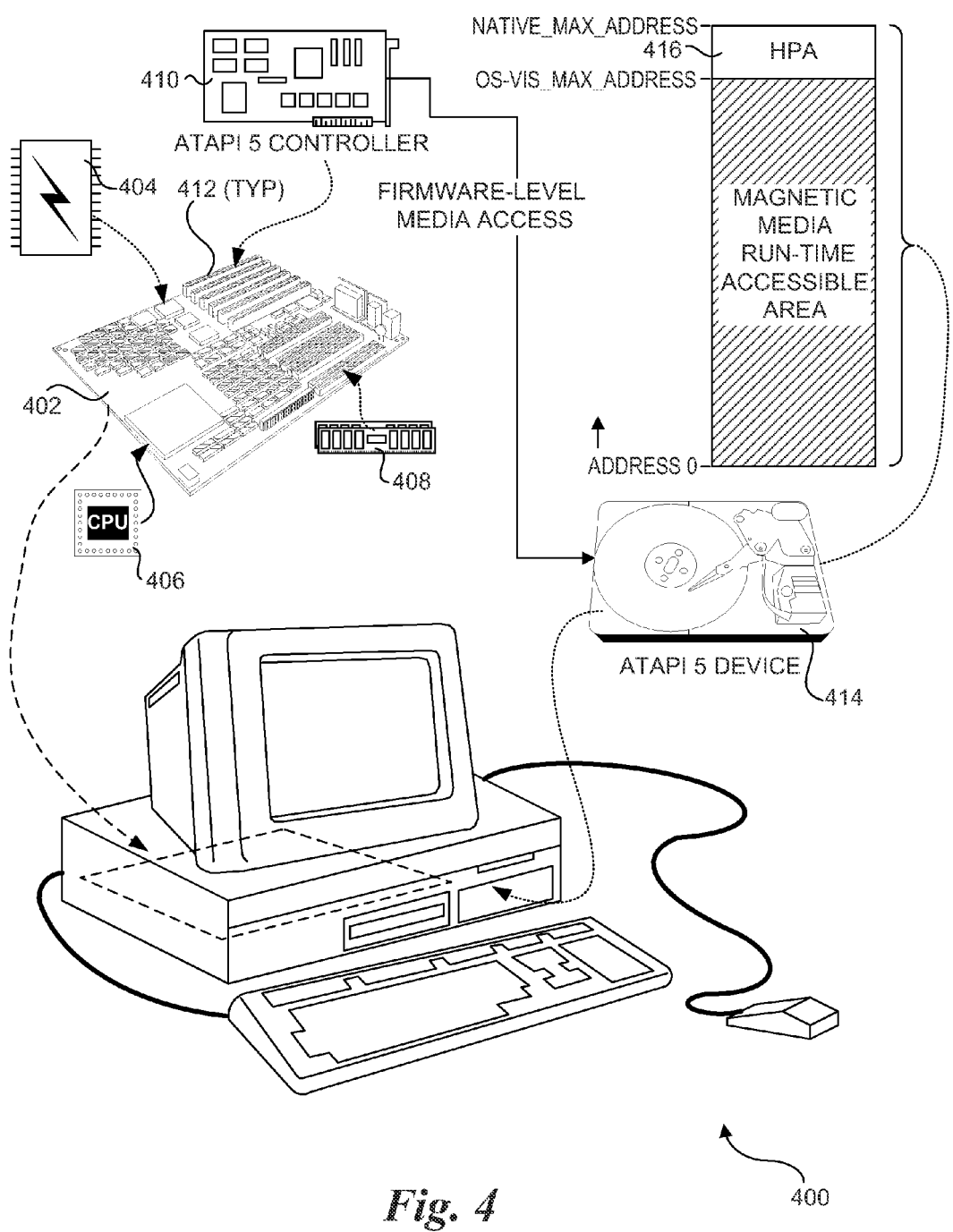
FIG. 4 is a schematic diagram of a computer system containing firmware in accordance with embodiments of the invention that enable access to a protected area of media on a magnetic storage device.

With reference to the flowchart FIG. 3, a generalized process for accessing firmware stored on a hard disk in accordance with an embodiment begins in a block 300 corresponding to a system start/power on event (i.e., a cold boot or system reset). In response to the event, early system firmware is loaded and executed in a manner similar to that discussed above with reference to block 200 of FIG. 2, in block 302. For example, FIG. 4 shows a computer system 400 including a mainboard 402 on which a flash device 404 is mounted. The flash device contains firmware for initializing the computer system and for supporting BIOS run-time services. This firmware is loaded and executed by a processor 406 to perform the system initialization operations described herein. In general, firmware may be copied into memory 408 prior to execution and for subsequent use for run-time firmware drivers. These initialization operations continue in a block 304, wherein a firmware-level hard disk/controller interface is initialized. This interface provided the low-level interface between software (specifically an operating system), and the hard disk subsystem (controller and hard disk device). In one embodiment, the interface comprises an ATAPI 5 compatible device driver.

The disk interface enables firmware to access hard disks connected to an ATAPI-compatible hardware interface via a set of commands. Typically, a peripheral device or chip is employed to facilitate this hardware interface, such as shown in FIG. 4, wherein computer system 400 includes an ATAPI 5 controller peripheral card 410 that is inserted into an expansion slot 410 in mainboard 402. Optionally, the ATAPI hardware interface may be facilitated by an ATAPI peripheral device controller chip 412.

Returning to the flowchart, the process continues in a block 306 in which the firmware disk interface issues a READ_NATIVE_MAX_ADDRESS command to the ATAPI controller (peripheral card or chip) to determine the native size of the media (hard disk) connected to the controller. This command is one of the commands employed by the ATAPI 5 HPA feature command set. As shown in FIG. 4, this command will return the highest address (size) of the storage space available on an ATAPI 5-compatible storage device (e.g., hard disk) 414 (i.e., the media). The firmware will then issue a SET_MAX_ADDRESS=the value returned from the READ_NATIVE_MAX_ADDRESS command in a block 308. This enables access to all of the storage space on the media.

Next, in a block 310, any media access operations corresponding to an HPA region 416 on the media are performed. As described above, the HPA region comprises a special portion of the media that is not visible to the operating system, and thus data may be stored in this region of the media in an OS-independent manner. For example, the firmware may define its own data storage scheme, such as a firmware-specific file system.

Generally, HPA region 416 may contain data that is either pre-loaded (e.g., by a system vendor or integrator), or is generated by the system during pre-boot and/or run-time operations. Typically, this portion of the media may be used to store data that are specific to the computer system, such as system configuration information, fault diagnostic information, performance information, etc. In one implementation, the HPA region is used to store additional firmware that is loaded and executed during pre-boot, as described below in further detail.

After the HPA region of the media has been accessed, it is necessary to redefine the size of the media such that the operation system cannot overwrite data stored in the HPA region. Under the ATAPI 5 HPA feature command set, a scheme is employed to "hide" the HPA region from the operating system. This is accomplished by providing information to the OS that indicates the size of the media is the media's native size minus the portion of the media reserved for HPA access. Thus, in a block 312 the firmware issues a SET_MAX ADDRESS=Watermark value that defines the top of the media address that will be visible to the operating system. The region between the media's top native address and this watermark comprises the HPA region of the media.

The SET_MAX_ADDRESS command allows the host to redefine the maximum address of the user accessible address space. Accordingly, when the SET_MAX_ADDRESS command is issued with a maximum address that is less than the native maximum address, the device reduces the user accessible address space to the maximum set, providing a protected area above that maximum address. Under the ATAPI 5 specification, a SET_MAX_ADDRESS command is to be immediately preceded by a READ_NATIVE_MAX_ADDRESS command.

After the SET_MAX_ADDRESS command has been issued, the device will report only the reduced user address space in response to an IDENTIFY_DEVICE command (which is commonly used by the OS (through the firmware device driver) to determine the Media size and other device parameters). Any read or write command to an address above the maximum address specified by the SET_MAX_ADDRESS command will cause command completion with an error indication returned, or otherwise aborting the command.

Depending on the implementation, access to the HPA region may be provided only during pre-boot, or may be provided both during pre-boot and run-time. Accordingly, in a decision block 314 a determination is made to whether run-time support is to be provided. If the answer is NO, the firmware issues a SET_MAX_FREEZE command in a block 316 to disable changing the maximum address until the next system reset. Internally, issuance of the command toggles a volatility bit in the Sector Count register that enable the host to specify whether the maximum address set is to be preserved across power-on or hardware reset cycles. On power-on or hardware resets, the device maximum address returns to the last non-volatile address setting regardless of subsequent volatile SET_MAX_ADDRESS commands. Issuance of the SET_MAX_FREEZE command locks out access to any address above the most recently issued SET_MAX_ADDRESS command until the next system reset or power on event, and thus if this command is issued during pre-boot, access to the HPA region will be disabled during run-time operations.

In some implementations, it may be desired to provide access to the HPA region during OS run-time. However, in order to preserve the integrity of the HPA region data, this should be done in a manner that is transparent to the operating system. As a secondary measure, it may be advantageous to employ security measures provided by HPA feature command set. Accordingly, in an optional block 318, HPA security support measures are set up. The security features include password support that enables rogue, malicious, or otherwise errant code from accessing the HPA region. In addition to providing run-time security support, the security feature may also be employed during pre-boot to prevent non-trusted firmware components from accessing the HPA region.

Figure 5:
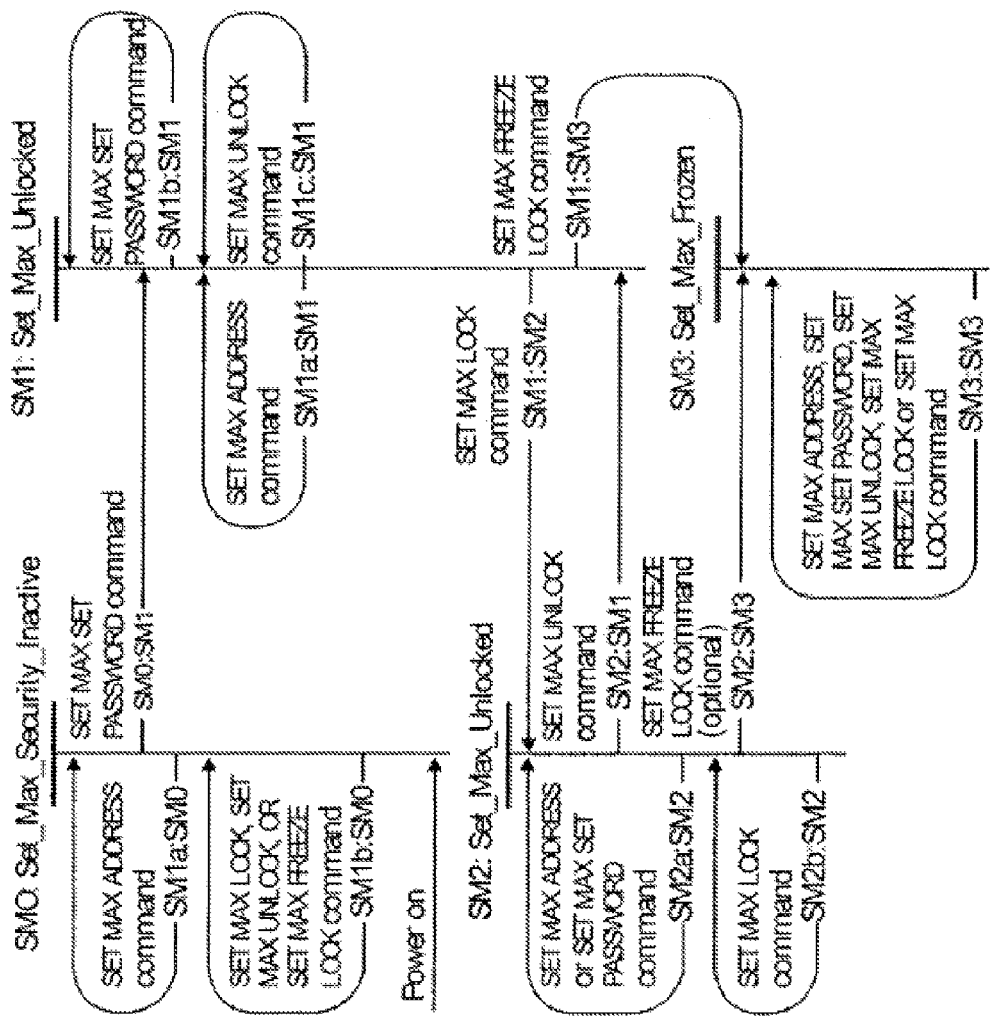
FIG. 5 is a state diagram illustrating various mechanisms for invoking state transitions in accordance with a security scheme that may be implemented by embodiments of the invention.

With reference to the state diagram of FIG. 5, security measures under ATAPI 5 operate in the following manner. Page 43. The state diagram contains for states: SM0: the Set_Max_Security_Inactive state; SM1: the SET_Max_Unlocked state; SM2: the SET_Max_Locked state; and SM3: the Set_Max_Frozen state. The SM0: Set_Max_Security_Inactive state is the default state that is entered with the device is first powered on. When in this state, SET MAX security is disabled. Subsequently, state transitions proceed as follows:

Transition SM0a:SM0: When a SET MAX ADDRESS command is received, the command will be executed and the device will make a transition to the SM0: Set_MAX_Security_Inactive state.

Transition SM0b:SM0: When a SET MAX LOCK, SET MAX UNLOCK, or SET MAX FREEZE LOCK command is received, the device will abort the command and make a transition to the SM0: Set_MAX_Security_Inactive state.

Transition SM0:SM1: When a SET MAX-SET PASSWORD command is received, the device will make a transition to the SM1: Set_Max_Unlocked state. SM1: Set_Max_Unlocked: This state is entered when a SET MAX SET PASSWORD or a SET MAX UNLOCK command is received. When in this state, a SET MAX security password has been established and the SET MAX security is unlocked.

Transition SM1a:SM1: When a SET MAX ADDRESS command is received, the command will be executed and the device will make a transition to the SM1: Set_MAX_Unlocked state.

Transition SM1b:SM1: When a SET MAX SET PASSWORD is received, the password stored by the device will be changed to the new value and the device will make a transition to the SM1:Set_MAX_Unlocked state.

Transition SM1c:SM1: When a SET MAX UNLOCK command is received, the command will not be executed and the device will make a transition to the SM1: Set_MAX_Unlocked state.

Transition SM1:SM2: When a SET MAX LOCK command is received, the device will make a transition to the SM2: Set_Max_Locked state.

Transition SM1:SM3: When a SET MAX FREEZE LOCK command is received, the device will make a transition to the SM3: Set_Max_Frozen state.

SM2: Set_Max_Locked: This state is entered when a SET MAX LOCK command is received. When in this state, a SET MAX security password has been established and the SET MAX security is locked.

Transition SM2a:SM2: When a SET MAX ADDRESS or SET MAX SET PASSWORD command is received, the command will be aborted and the device will make a transition to the SM2: Set_Max_Locked state.

Transition SM2b:SM2: When a SET MAX LOCK command is received, the command will be executed and the device will make a transition to the SM2: Set_Max_Locked state.

Transition SM2:SM1: When a SET MAX UNLOCK command is received, the device will make a transition to the SM1: Set Max Unlocked state.

Transition SM2:SM3: When a SET MAX FREEZE LOCK command is received, the device may make a transition to the SM3: Set_Max_Frozen state. Hosts should not issue the SET MAX FREEZE LOCK command when in this state. (This transition is proposed to be removed in the ATA/ATAPI-6 standard).

SM3: Set_Max_Frozen: This state is entered when a SET MAX FREEZE LOCK command is received. In this state, the device may not transition to any other state except by a power cycling.

Transition SM3:SM3: When a SET MAX ADDRESS, SET MAX SET PASSWORD, SET MAX UNLOCK, SET MAX FREEZE LOCK, or SET MAX LOCK command is received, the command will be aborted and the device will make a transition to the SM3: Set_Max_Frozen state.

Run-time HPA region access support might be enabled under situations in which it is desired to store system data and parameters during run-time in a manner that is transparent to the operating system. In particular, such information may be saved without requiring any operations by the operating system, and in fact may even be performed when the operating system crashes. Typically, the implementation will be enabled through some OS-transparent event detection and service mechanism, such as the System Management operational mode (SMM) provided by various Intel processors. For example, a SMM system management interrupt (SMI) may be invoked in response to a pre-selected event (e.g., OS crash), and a corresponding interrupt service routine may be performed in which various data, such as register values, memory contents, etc., are written to the HPA region. Returning to the flowchart of FIG. 3, operations performed by such an event detection and service mechanism are depicted in block 320-330, beginning with the detection of the event and invocation of an appropriate service routine.

Next, in blocks 322 and 324 the firmware issues a READ_NATIVE_MAX_ADDRESS command and sets the maximum accessible address for the to the top of the native address space, thus opening the HPA region. If HPA security is implemented, appropriate commands and passwords may also need to be issued to effectuate access to the HPA region. At this point, the firmware may access the HPA region to write and/or retrieve data, as depicted in a block 326.

A determination is next made in a decision block 327 to whether continued run-time support is wanted. As discussed above, it may be desired to save register and/or memory data in the case of a particular event, such as an OS crash. In such a case, subsequent run-time support will not be applicable until a system reset is performed, and the operating system is re-booted. Thus, the answer to decision block 327 will be no, and the process will exit. In cases in which the OS is still operating, it may be desired to continue to provide run-time access to the HPA. Since the maximum accessible address has been raised to provide HPA region access, it is possible that the operating system (via appropriate firmware device driver calls) could access the HPA region at this point. To prevent this, the maximum address is reset via the SET_MAX_ADDRESS command in a block 330 to the OS-VIS_MAX_ADDRESS watermark, and the cycle returns to wait for the next detected event.

It is noted that it may be possible under some circumstances for the operating system to access the HPA region after block 326. However, if the HPA access is set up to be performed during an OS-transparent operation, such as servicing of an SMI with a service routine that concludes by returning the maximum address to the OS-VIS_MAX_ADDRESS watermark in block 330 prior to returning control to the operating system, the OS will be precluded from accessing the HPA region.

In one embodiment, the magnetic media firmware access mechanism is implemented during pre-boot in accordance with a recently introduced firmware load and execution framework called the Extensible Firmware Interface (EFI) (see, developer*intel*com/technology/efi; Note: periods have been replaced with asterisks to avoid inadvertent hyperlinks). More particularly, EFI enables firmware to be loaded, in the form of firmware modules and drivers, from a variety of different resources, including primary and secondary flash devices, option ROMs, and various persistent storage devices (e.g., hard disks, CD ROMs, etc.)

Figure 6:
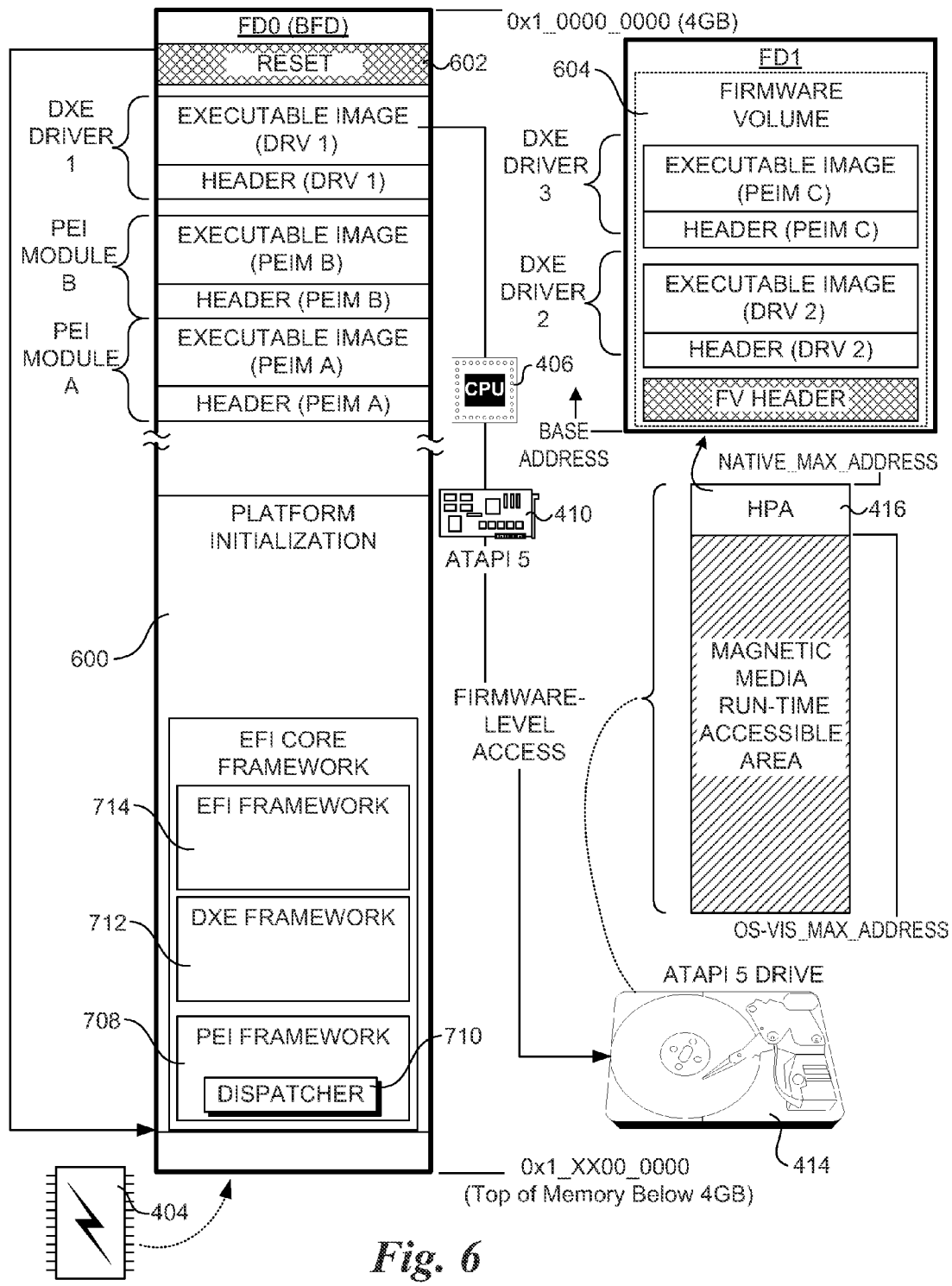
FIG. 6 is a schematic diagram illustrating a firmware configuration employed by one embodiment of the invention for accessing a protected area of media containing extended firmware in accordance with the Extensible Firmware Interface (EFI) framework.

With reference to FIG. 6, in response to a cold boot or system reset, the instruction pointer of an EFI-compliant computer system's microprocessor is directed to the first instruction in a set of platform initialization firmware code 600 that is stored on a firmware device (FD) 0. This firmware device, which typically will comprise a non-volatile memory component such as a flash device or ROM BIOS chip, comprises the boot firmware device (BFD) for the system. Execution of the platform initialization firmware begins at a reset code portion 602, and proceeds sequentially until all of the firmware to initialize the computer system has been executed.

Figure 7:
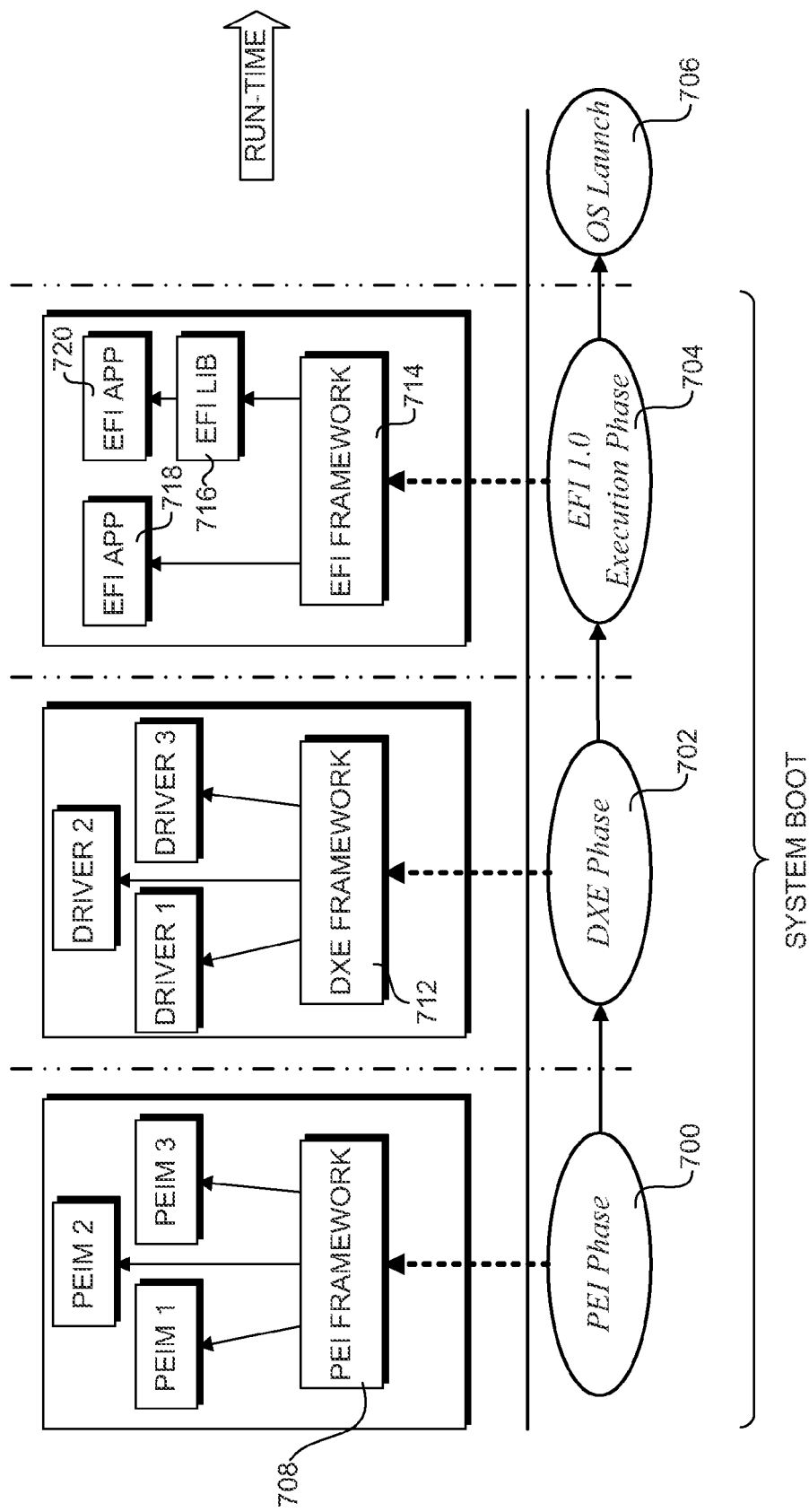
FIG. 7 is a block schematic diagram illustrating a multi-phase computer system initialization scheme corresponding to a system boot under the EFI framework.

Under the EFI 2.0 architecture, this initialization process includes various execution phases of the firmware, as shown in FIG. 7. These execution phases, which include a Pre-EFI Initialization (PEI) phase 700 a Driver eXecution Environment (DXE) phase 702, and an EFI 1.0 execution phase 704, enable initialization and set-up of various platform devices and services, and enable an operating system (OS) to be booted in accordance with an OS launch phase 706. Accordingly, the phases preceding the OS launch phase are collectively referred to herein as the pre-boot phase or simply "pre-boot."

The PEI phase is responsible for main memory initialization and setting up enough of the platform fabric and resources to hand-off control to the DXE phase. As such, the firmware code that is executed to perform the PEI phase includes an Instruction Set Architecture (ISA)-specific PEI core 708, which is also referred to as PEI framework 708. The PEI framework includes firmware corresponding to a dispatcher 710, which upon execution is used to locate and dispatch for execution one or more Pre-EFI initialization modules, also referred to herein as PEI Modules or PEIMs. Firmware code in the PEIMs is used to abstract the particular platform, chipset, and policy abstractions from the baseboard.

During the DXE phase, an ISA-specific DXE core (i.e., DXE framework 712) is executed, enabling one or more DXE drivers to be loaded. The DXE drivers are responsible for providing input/output (I/O) services, such as block device abstraction, consoles, and the EFI file system. These drivers include a distinguished driver called the Boot-Device Selection (BDS) that is responsible for abstracting the operation system load and console selection policy.

During the EFI 1.0 execution phase, firmware code corresponding to an EFI framework 714 that provides core EFI operations is executed. The EFI framework also registers an EFI library 716, and one or more EFI applications 718 and 720. Generally, the EFI applications are non-persistent executable images that are used for transient services, such as platform setup, clock setting, etc.

Each of the PEIMs and the DXE drivers may be provided by the microprocessor vendor (e.g., Intel), the platform manufacturer or integrator (e.g., Hewlett-Packard, Dell, Compaq, etc.), a BIOS vendor (e.g., AMI, Phoenix, etc.), or an independent third party. Firmware code corresponding to the PEIMs and DXE drivers provided by a microprocessor vendor or platform manufacturer will typically be stored in the BFD and/or another firmware device that is accessible to the platform (e.g., mounted to the platform's baseboard) and is included in the original computer system. For example, as shown in FIG. 6, firmware code corresponding to a PEIM module A, a PEIM module B and a DXE driver 1 are stored on FD0, while DXE drivers 2 and 3 are stored on a firmware device FD1. Similarly, PEIM and DXE driver firmware code provided by a BIOS vendor will generally be stored on the BFD and/or another baseboard-mounted firmware device. DXE drivers may also be stored in option ROMs that are provided with various add-on peripheral cards, such as SCSI driver cards that are used to drive SCSI devices (not shown).

In one embodiment, various sets of firmware code are arranged on various firmware devices in the form of "firmware volumes." This is enabled through use of a firmware abstraction interface known as a firmware volume protocol instance. The firmware volume protocol instance is published by a corresponding firmware volume driver that is loaded during execution of the early firmware phase.

As a starting point, any firmware code that is accessed by a system is stored in some sort of firmware device. A firmware device is a persistent physical repository containing firmware code and/or data. While a firmware device may typically comprise a PROM or a FLASH component, other types of persistent storage devices may also be used, such as a local hard disk. A single physical firmware device may be divided into smaller pieces to form multiple logical firmware devices. Similarly, multiple physical firmware devices may be aggregated into one larger logical firmware device. A logical firmware device is called a firmware volume. In EFI 2.0, the basic storage repository for data and/or code is the firmware volume. In general, each firmware volume is organized into a file system. In one embodiment, this file system is called a firmware file system (FFS). Other file systems may also be used. As such, the file is the base unit of storage for EFI 2.0 firmware.

Figure 8:
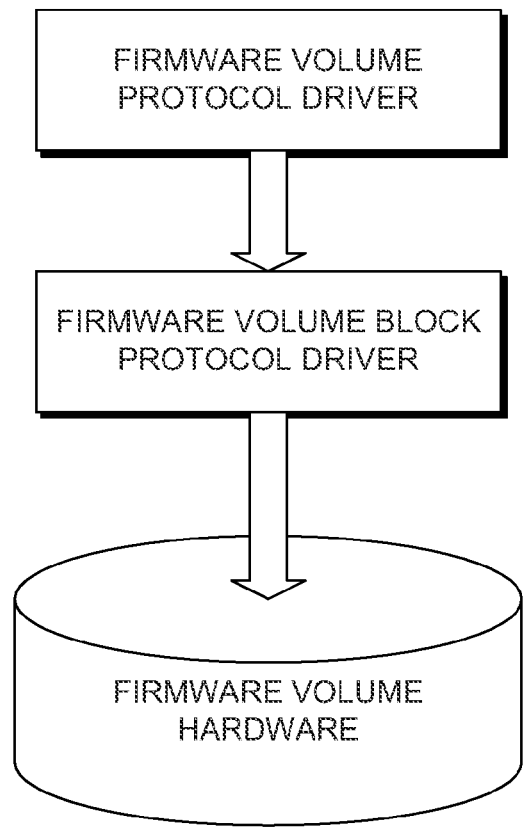
FIG. 8 is a block diagram of a protocol stack corresponding to a firmware volume access scheme in accordance with the EFI framework.

The DX phase accesses firmware volumes using the file abstraction contained in the Firmware Volume Protocol. The Firmware Volume Protocol allows DXE to access all types of firmware volumes, including those that are not memory mapped and those that do not implement the Firmware File System (FFS) format, a firmware-based file system construct. Typically, the Firmware Volume Protocol will be produced by the FFS driver and will layer on top of the Firmware Volume Block Protocol to access the firmware volume hardware. This implementation yields the protocol stack shown in FIG. 8.

Figure 9:
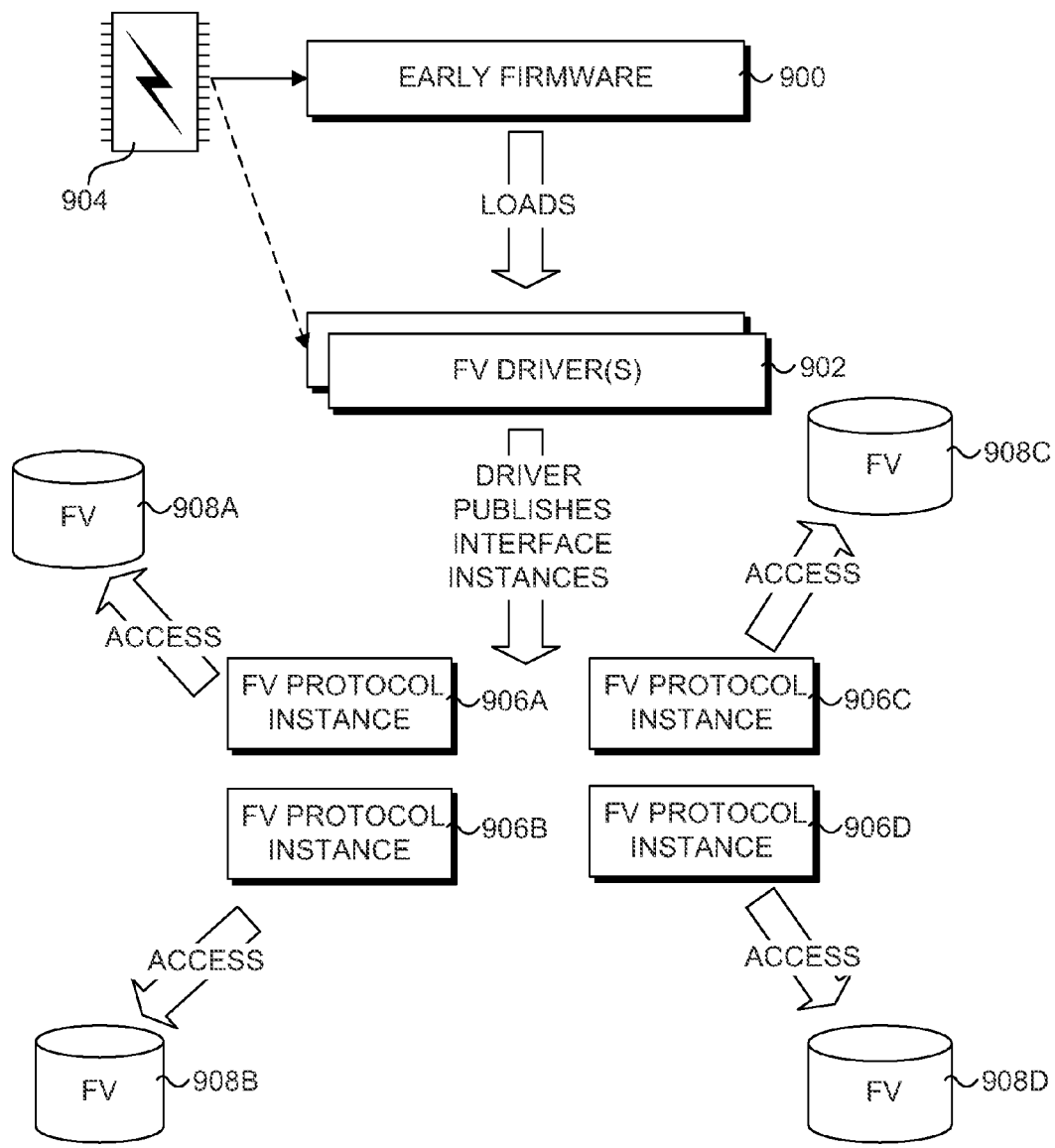
FIG. 9 is a flow diagram illustrating the process of loading and executing firmware to further access extended firmware stored on one or more firmware volumes in accordance with the EFI framework.

With reference to FIG. 9, in one embodiment a firmware volume access mechanism is implemented as follows. During execution of early firmware 900, one or more firmware volume drivers 902 are loaded from a local firmware device 904 (e.g., flash device 404) and executed. Execution of each firmware driver causes one or more firmware volume protocol instances to be published, as depicted by FV protocol instances 906A, 906B, 906C, and 906D. Each FV protocol instance provides an abstracted interface that enables consumers of firmware to access that firmware from a corresponding firmware volume, as depicted by firmware volumes 908A, 908B, 908C, and 908D. By publishing these abstracted interfaces, the firmware volumes corresponding to those interfaces are made visible to the system.

Returning to FIG. 7, in accordance with principles of the invention, one or more firmware volumes may be stored on an HPA region of one or more system magnetic storage devices, such as hard disk 414. For example, in the illustrated embodiment of FIG. 7, HPA region 416 comprises a logical firmware device FDI, which contains a set of data corresponding to a single firmware volume 604. In one embodiment, data within a firmware volume is logically configured based on a block-based allocation scheme.

Figure 10:
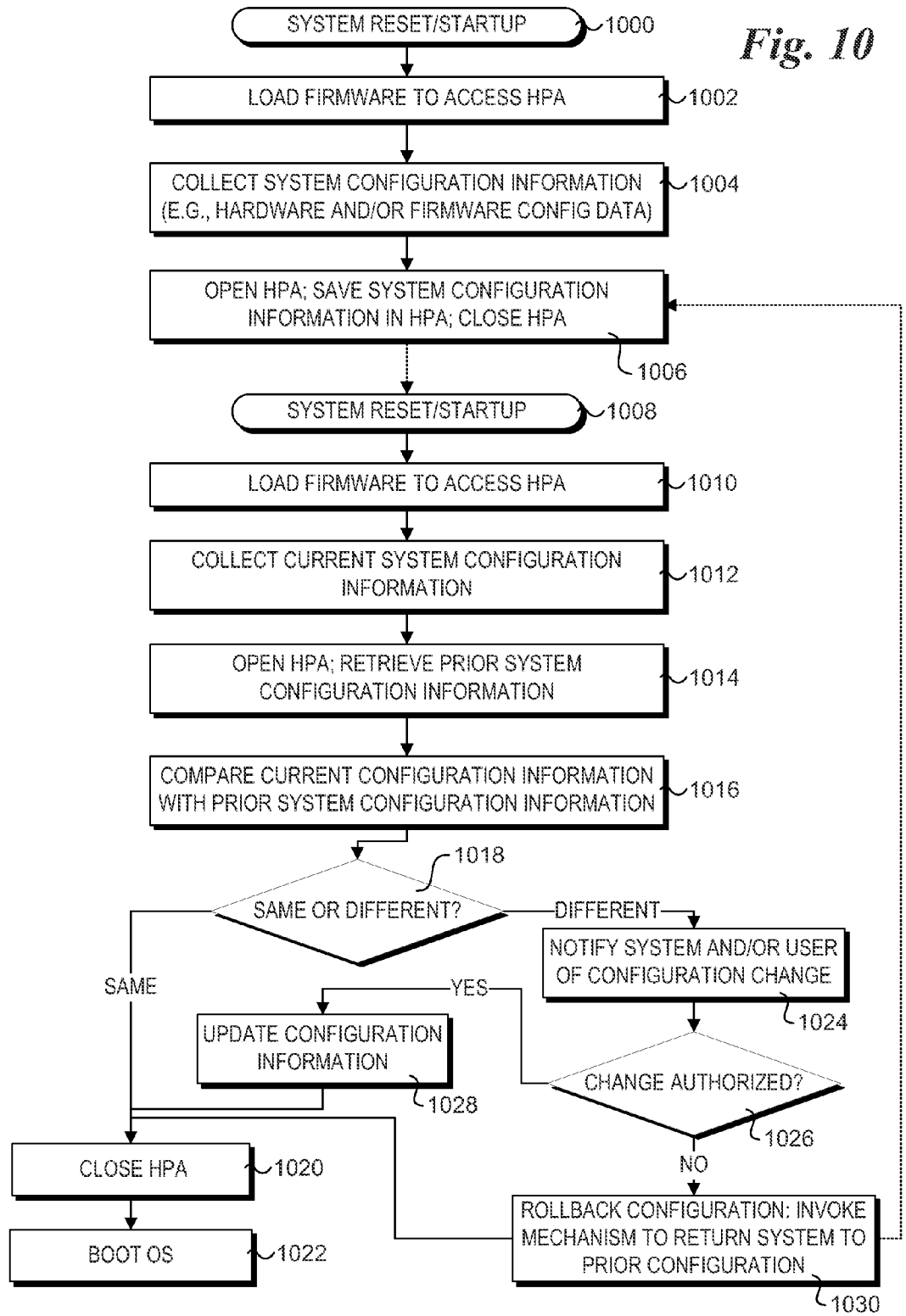
FIG. 10 is a flowchart illustrating a process for storing system configuration information in the protected area of the media and for rolling back a system configuration in the event an unauthorized system configuration change has occurred.

In addition to providing a firmware storage and access mechanism, the protected media area access techniques disclosed herein may be implemented during pre-boot to save various system information, such as event logs, firmware and/or hardware configuration data, etc. For example, a process that implements this aspect of the invention in accordance with one embodiment is now described with reference to the flowchart of FIG. 10. The process begins in a start block 1000, which corresponds to a system reset or power on startup event. As before, appropriate firmware is loaded in a block 1002 to access the HPA of a selected magnetic media (e.g., the OS boot device, although another magnetic storage device may be used as well).

Next, in a block 1004, current system information is collected. This information may typically include various firmware and/or hardware configuration information. For instance, this information may be collected in one embodiment by storing such information in an event log during firmware initialization. After the configuration information is collected, the HPA is opened, the configuration information is saved in the HPA, and the HPA is closed, as depicted by a block 1006.

Subsequently, a new system reset or power on startup event occurs in accordance with a start block 1008. Again, firmware is loaded to access the HPA in a block 1010, and current system configuration information is collected in a block 1012 in a similar manner to the operations of blocks 1002 and 1004. The HPA is opened in a block 1014, and the prior system configuration information that was previously written to the HPA is retrieved. The current and prior configuration information data are then compared in a block 1016.

A determination is then made in a decision block 1018 to whether the current and prior configuration information is the same (indicating no configuration change) or different (indicating a configuration change has occurred. If the configuration hasn't changed, the logic proceeds to a block 1020 in which access to the HPA is closed. The operating system then boots and the pre-boot phase has completed in the normal manner, as depicted by a block 1022.

If the configuration information indicates a change has occurred, the logic proceeds to a block 1024 in which the system and/or user is notified of the change. In some instances, an undesired or unauthorized system change might be made by a rogue entity, such as a third-party firmware component. In other instances, an improperly coded firmware component may produce an unwanted configuration change. Accordingly, a determination is made in a decision block 1026 to whether the change should be authorized. Generally, this determination may be automatically made by the system firmware, or could be determined by a user through an appropriate user interface.

If the configuration change is authorized, the logic proceeds to a block 1028 in which the configuration information in the HPA is updated, whereupon the access to the HPA is closed followed by subsequent booting of the operating system boots in blocks 1020 and 1022, respectfully.

In one embodiment, it is desired to prevent unstable configurations. Accordingly a configuration rollback mechanism is employed in a block 1030 in response to a determination that the change was not authorized, whereby the current system configuration is changed back to a prior configuration. In general, this change may take immediate effect, or may require a system reset, wherein the new configuration is prevented from being entered during a subsequent pre-boot. For instance, data may be stored in the firmware (either in a non-volatile memory device or the HPA to prevent one or more firmware components from being loaded. Since the new (temporally) configuration information was never updated in the HPA and is no longer valid, the HPA is simply closed from access in block 1020, completing the process.

Generally, the firmware for performing the operations discussed herein will be stored on the system's BFD, and possibly other system firmware devices, such as a secondary flash component or the like. Typically, such firmware may either be included with an original system, or updated at a subsequent point in time, such as via a flash rewrite using firmware code that is stored on removable media (e.g., CD-ROM or floppy disk), or downloaded over a computer network. As used herein, these firmware storage means machine-readable mediums. A machine-readable medium includes any mechanism for storing or transmitting information in a form readable by a machine (e.g., a computer). For example, a machine-readable medium may include such devices as a read only memory (ROM); a magnetic disk storage media; an optical storage media; and a flash memory device, etc. In addition, a machine-readable medium may include propagated signals such as electrical, optical, acoustical or other form of propagated signals (e.g., carrier waves, infrared signals, digital signals, etc.) that are received via wired or wireless computer networks.

With the landscape of non-volatile memory evolving from strictly being related to I/O storage into one where the role of some non-volatile memory is being considered as a possible memory replacement, it can be advisable to change the emphasis on memory usage models and to move toward a differing usage model for Flash memory solutions. Future platforms to be available, for example, from Intel Corporation, will have many gigabytes of Flash storage embedded within them. Thus, there is a definite series of usage opportunities that may be established. Embodiments of the present invention extend the above identified concepts of using hidden regions in an HPA to non-magnetic NV storage which would not necessarily be coupled to an ATAPI 5 compatible controller. This implementation may be useful as platform vendors become heavily invested in a much wider and deeper proliferation of NAND/FastFlash/PCM SSD (solid-state disk) solutions into PC platform solutions.

Embodiments of the present invention employ a mechanism which utilizes a method to lock-down a block device in a form compatible with ATAPI's HPA support and describes the utilization of that area as a platform-only firmware extension repository. This implementation extends the above identified concept of using protected/hidden region of a magnetic media under firmware control.

Utilizing the non-magnetic storage hidden areas allows storage of platform-specific firmware extension on Flash memory, for instance, as well as enabling crisis recovery based on storing information in the hidden repository. Initially, HPA regions were used primarily for optional diagnostic applications by booting an alternate boot target. The HPA is invisible to the OS. Existing systems do not have this capability or feature for solid-state storage devices. Embodiments described above allow rollback to previous platform configurations, based on tracking configuration update/change information in the magnetic media HPA.

Embodiments of the present invention may store this configuration change information in a non-magnetic hidden region, similar to an HPA on magnetic media. Similarly, the BIOS carves a region of the Flash memory, for instance, as a hidden region. As described above for HPA in magnetic media, prior to OS launch, this hidden region is locked down so that the OS has no access to the hidden region in memory. A maximum address for the media is set so that the OS is not aware of the hidden region. If the OS tries to access memory in the hidden region a fault will occur because it is not an authorized region of memory.

In systems being deployed now and in the future, magnetic media may be non-existent. Some devices, for instance low power, portable devices, may have only sold-state media, or Flash memory. Therefore, it is desirable to be able implement the equivalent of HPA in solid-state devices. In implementations involving magnetic storage, the ability to control the hidden region depended on hard drive device controller technology. Flash memory device controllers utilize differing technology than for magnetic storage.

Flash memory operates differently than magnetic storage. However, there are software and hardware constructs available to control access to the device. In embodiments of the present invention, interface access to the device may be emulated. For instance, a virtual machine monitor (VMM) may be used to capture accesses to the Flash memory device. A platform resource layer (PRL) may also be used to sequester the hidden area on the Flash memory device. Regardless of the implementation, the hidden area of the Flash memory device, called HPA, below, for simplicity, will not be accessible directly to the OS, but only to system calls and firmware services.

Solid-State Media Firmware-Controlled Access Scheme

Figure 11:
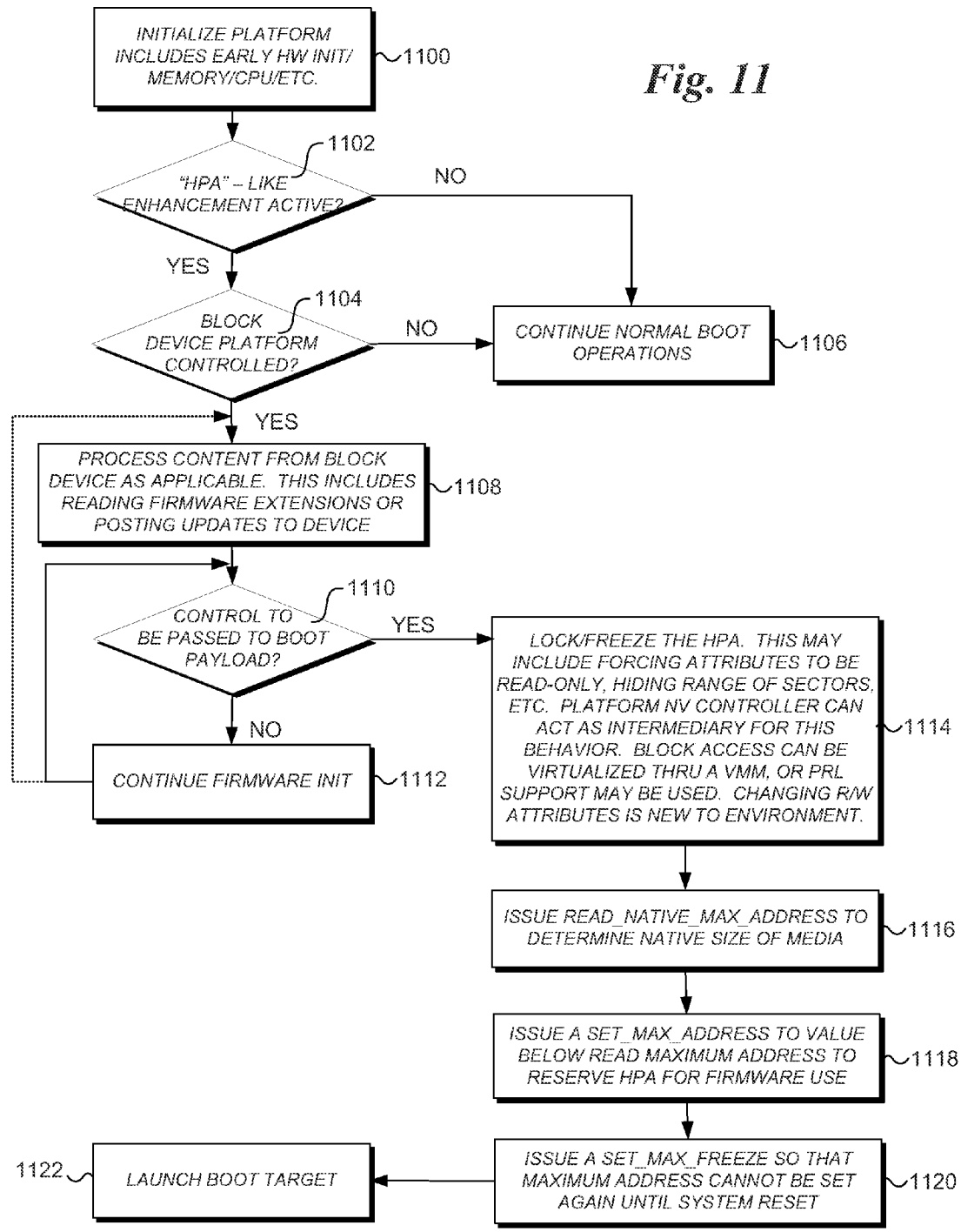
FIG. 11 is a flow chart illustrating process for storing system configuration information in the protected area of solid-state media which allows for rolling back a system configuration in the event an unauthorized system configuration change has occurred, according to an embodiment of the invention.

Referring now to FIG. 11, there is shown a process that implements this aspect of the invention in accordance with one embodiment. The process begins in block 1100, after a system reset or power on startup event. Appropriate firmware is loaded and executed, in block 1100, to perform the system initialization operations described herein. In general, firmware may be copied into memory prior to execution and for subsequent use for run-time firmware drivers. In an embodiment, a determination is made as to whether HPA-like enhancement for the solid-state memory is active, in block 1102. This determination may be based on a platform policy embedded in the chipset SKU identifier or in the memory controller. When implemented in software, the firmware may be coded to identify that this feature is enabled. If the platform is not HPA enabled, normal boot operations are continued in block 1106.

If the platform is configured with the HPA-like enhancement, then a determination is made, in block 1104, as to whether this block device feature should be used, e.g., is the feature active. This may be found in platform-specific configuration data, similar to a platform setup option. If this feature is inactive then normal boot operations are continued in block 1106.

If the block device feature is active, then content from block device is processed, as applicable, in block 1108. This processing may include reading firmware extensions or posting updates to device. Upon a boot failure, the platform may be restored to a last known good working state at this point, as described above, for instance in conjunction with FIG. 10. A variety of applications may be stored in the hidden region to be processed at this point before the launch of the OS.

A determination is made as to whether control is to be passed to boot the payload, i.e., the OS launcher, in block 1110. If the platform is not ready to launch the OS, then firmware initialization is continued, in block 1112. Control may be passed back to block 1108 to process additional firmware data, or to block 1110 to wait until the OS is ready to be launched, i.e., all boot processes are compete.

If boot is to commence, then the HPA is locked, or frozen, in block 1114. This Lock/Freeze may include forcing attributes to be read-only, hiding range of sectors, etc. The platform NV controller, i.e., the Flash interface, may act as intermediary for this behavior. This controller acts is similar to a disk controller and the conceptual equivalent to a hard drive controller. Block access may be virtualized through a VMM, or PRL support may be used. Changing the read/write attributes are new to environment, and not performed in existing systems. In other words, whereas, the concept of the controller blocking access to certain locations of media is generally known in the art, the concept of being able to enforce read-only attributes (giving access but blocking writes) or other allowing only write access is achievable using embodiments of the present invention.

In an embodiment the control for the HPA-like hidden region of Flash memory may be implemented in the hardware memory controller. In another embodiment, control of the hidden region is implemented by virtualization, e.g. with a VMM component. Thus, this feature may be implemented in either hardware or software, or a combination of both. Regardless of how the interface abstraction is implemented as a device driver for the Flash memory, access to the memory appears similar to access to magnetic media, to the OS. It is the abstraction interface that controls the hidden region and protects this region from OS access.

In the following discussion, reference is made to command names that are used in the HPA magnetic media embodiment discussed above. In embodiments utilizing solid-state media, the equivalent of the functionality of the commands may be performed, but the implementation is not identical to the embodiments discussed above. However, the functions are similar and the command names are used for simplicity.

In an embodiment, once the hidden region is locked, a READ_NATIVE_MAX_ADDRESS command is issued to determine native size of media. In another embodiment, this command may be performed earlier, before the region is actually locked. Once the maximum address is set, the OS cannot access the hidden region, above this address. It should be noted that aspects of the process as described in FIG. 3 apply to solid-state hidden regions, as well. FIG. 11 shows a process to set up the hidden region for sold state media, but utilization of this feature may be performed as described in conjunction with FIG. 3. For instance, run time access to the hidden region may be implemented as described for blocks 314, 318, 320, 322, 324, 326 and 330.

In block 118 a SET_MAX_ADDRESS command may be issued to a value below the read maximum address to reserve the hidden region for firmware use. In bock 1120, a SET_MAX_FREEZE command may be issued so that the maximum address cannot be set again until system reset. Once the maximum addressable location is set and appropriately locked, the boot target may be launched in block 1122.

It should be noted that the commands issued in blocks 1116, 1118 and 1120 are equivalent to the commands used for HPA regions in magnetic media, but are not in fact identical constructs. In a VMM implementation, these commands may simply set local configuration parameters defining the available regions in memory. In a memory controller implementation, like the method as described for a VMM abstraction which intercepts access to the device using virtualization, the memory controller is the hardware component acting as intermediary to the solid-state storage device. Similar features may be implemented within the logic of the memory controller so that the same read/write/access attributes can be directly programmed into that hardware. Existing memory controllers do not have this capability; however one of skill in the art would understand how to redesign the memory controller according to the description disclosed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for accessing computer system firmware, comprising:

accessing, via a first portion of firmware, a protected area of media on which data are stored by a solid-state storage device, said data including a second portion of firmware;

loading the second portion of firmware for subsequent use by the computer system, and allowing authorized access and preventing unauthorized access to the protected area of the media during operating system run time in a manner that is transparent to the operating system.

2. The method of claim 1, wherein the operating system is prevented from accessing the protected area of the media by hiding the protected area of the media from the operating system.

3. The method of claim 1, wherein the protected area of the media comprises a portion of the media having an address range defined by respective lower and upper address limits, and wherein the protected area is accessed by performing operations including: setting a maximum accessible address for the media to correspond to the upper address limit; accessing the second portion of firmware; and resetting the maximum accessible address for the media to correspond to the lower address limit.

4. The method of claim 3, wherein the upper limit correspond to the native size of the media, the method further comprising determining the native size of the media.

5. The method of claim 3, further comprising freezing the maximum accessible address such that it may not be changed until the computer system is reset or restarted.

6. The method of claim 1, wherein accessing the solid-state storage device is controlled by at least one of a virtual machine monitor device driver abstraction, a platform resource layer device driver abstraction or a memory controller abstraction, and wherein accessing the protected area is controlled via the at least one abstraction.

7. The method of claim 1, further comprising accessing the protected area of the media during operating system runtime in a manner that is transparent to the operating system.

8. The method of claim 1, further comprising employing a security mechanism to prevent components that are not authorized to access the protected area from accessing the protected area.

9. The method of claim 1, wherein the second portion of firmware is stored in a firmware volume corresponding to the Extensible Firmware Interface (EFI) standard.

10. The method of claim 1, further comprising saving system information to the protected area of the media.

11. The method of claim 10, wherein the system information comprises an image of the boot code for the operating system.

12. The method of claim 10, wherein the system information comprises system state information.

13. The method of claim 10, wherein the system information comprises operating system file system information.

14. The method of claim 10, wherein the system information is saved during system run-time.

15. The method of claim 1, wherein allowing authorized access comprises automatically allowing authorized access and automatically preventing unauthorized access during operating system normal runtime in a manner that is transparent to the operating system during operating system normal runtime.

16. The method of claim 1 wherein accessing, via a first portion of firmware comprises booting a computer using the protected area of media accessed via the first portion of firmware in a manner that is transparent to the operating system.

17. A non-transitory machine-readable storage medium on which firmware is stored, which when executed on a computer system, enables the computer system to load a firmware driver for accessing a solid-state storage device; access, via the firmware driver, a protected area of media on which data are stored by the solid-state storage device, said data including extended firmware; and allow authorized access and prevent unauthorized access to the protected area of the media during operating system run time via the extended firmware in a manner that is transparent to the operating system.

18. The non-transitory machine-readable storage medium of claim 17, wherein execution of the firmware further enables the computer system to configure an access scheme for the solid-state storage device such that the protected area of the media is hidden from an operating system to run on the computer system.

19. The non-transitory machine-readable storage medium of claim 17, wherein the protected area of the media comprises a portion of the media having an address range defined by respective lower and upper address limits, and wherein execution of the firmware further enables the computer system to set a maximum accessible address for the media to correspond to the upper address limit prior to accessing the protected area of the media; and reset the maximum accessible address for the media to correspond to the lower address limit after completing access of the protected area of the media.

20. The non-transitory machine-readable storage medium of claim 19, wherein execution of the firmware further enables the computer system to freeze the maximum accessible address such that it cannot be changed until the computer system is reset or restarted.

21. The non-transitory machine-readable storage medium of claim 17, wherein access to the solid-state storage device is controlled by at least one of a virtual machine monitor device driver abstraction, a platform resource layer device driver abstraction or a memory controller abstraction, and wherein access to the protected area is controlled via the at least one abstraction.

22. The non-transitory machine-readable storage medium of claim 17, wherein execution of the firmware further enables the computer system to open up the protected area of the media for access during system run-time operation; save system information to the protected area; and close the protected area of the media from access.

23. The non-transitory machine-readable storage medium of claim 22, wherein the protected area is accessed in a manner that is transparent to the operating system.

24. The non-transitory machine-readable storage medium of claim 22, wherein the system information is saved in response to a system event and execution of the firmware further enables the computer system to detect the system event; switch execution of a computer system processor from an operating system controlled execution mode to an execution mode that is hidden from the operating system; servicing the system event by opening the protected area, write system information pertaining to the system event to the protected area, and close access to the system area; and return the execution mode of the processor back to the operating system controlled execution mode.

25. The non-transitory machine-readable storage medium of claim 24, wherein the system event is an operating system crash, and the system information comprises system state information at the time of the operating system crash.

26. A method comprising: collecting current system configuration information during computer system pre-boot operations; opening, via firmware control, a protected area of media corresponding to a solid-state storage device for access; writing data corresponding to the current system configuration in the protected area of the media; and allowing authorized access and preventing unauthorized access to the protected are of the media via firmware control during an operating system run time in manner that is transparent to the operating system.

27. The method of claim 26, wherein the current system configuration information pertains to a configuration of the computer system's firmware.

28. The method of claim 26, wherein the current system configuration information pertains to a configuration of the computer system's hardware.

29. The method of claim 26, further comprising: in response to a system reset or power on startup event, collecting new current system configuration information during current computer system pre-boot operations; opening, via firmware control, the protected area of media corresponding to a solid-state storage device for access; retrieving data stored in the protected area of the media corresponding to a prior system configuration; comparing the current system configuration information with the prior system configuration information; and determining if a change in the system configuration has occurred based on the comparison.

30. The method of claim 29, wherein it is determined that no change to the system configuration has occurred, further comprising closing access to the protected area of the media.

31. The method of claim 29, wherein it is determined that a change in the system configuration has occurred, further comprising notifying at least one of the system and/or a user that a system configuration change has occurred.

32. The method of claim 31, further comprising determining, via input from one of the system or the user, whether the change is authorized, and if it is, updating the system configuration information in the protected area of the media to reflect the new current configuration of the computer system.

33. The method of claim 31, further comprising determining, via input from one of the system or the user, whether the change is authorized, and if it is not, rolling back the system configuration to correspond to the configuration defined by the prior system configuration information.

34. The method of claim 26, further comprising: controlling access to the solid-state storage device by at least one of a virtual machine monitor device driver abstraction, a platform resource layer device driver abstraction or a memory controller abstraction, wherein access to the protected area is controlled via the at least one abstraction.

* * * * *